(No Model.)
D. SIDERSKY & H. PROBST.
PROCESS OF OBTAINING CARBONATE OF STRONTIUM.
No. 278,283. Patented May 22, 1883.
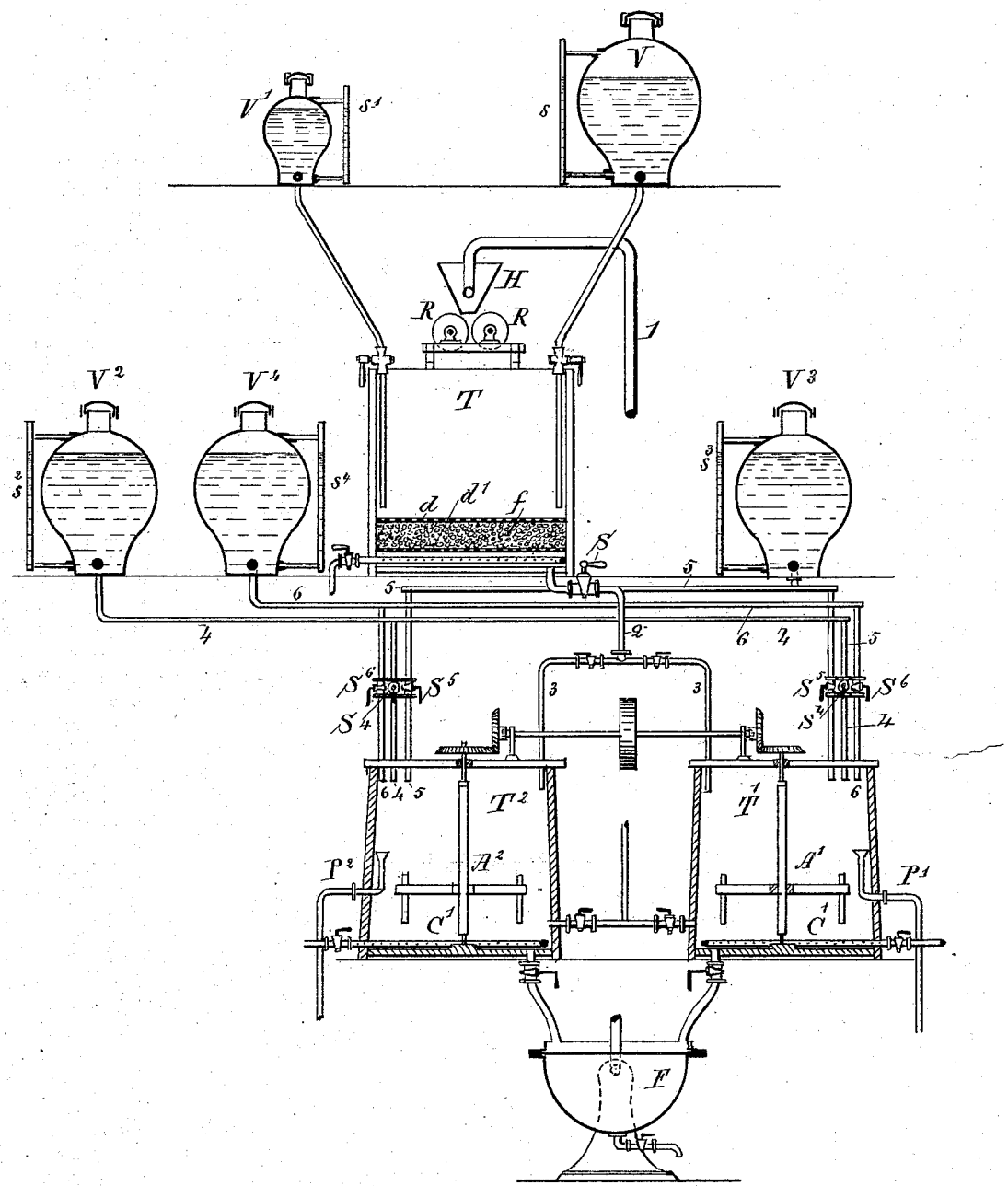
Witnesses.
William E. Prulter
H. A. Daniels
Inventors
David Sidersky
Hermann Probst

United States Patent Office.

DAVID SIDERSKY AND HERMANN PROBST, OF ROSITZ, GERMANY.

PROCESS OF OBTAINING CARBONATE OF STRONTIUM.

SPECIFICATION forming part of Letters Patent No. 278,283, dated May 22, 1883.

Application filed August 14, 1882. (No model.) Patented in England July 29, 1882, No. 3,609, and in Belgium July 29, 1882, No. 58,619.

*To all whom it may concern:*

Be it known that we, DAVID SIDERSKY, a subject of the Emperor of Russia, and HERMANN PROBST, a subject of the King of Prussia, residing at Rositz, Germany, have invented certain new and useful Improvements in the Process of Obtaining Carbonate of Strontium from the Residua in the Manufacture of Sugar by Strontianite, and in Apparatus therefor; and we do hereby declare the following to be a full, clear, and exact description of the invention, such as will enable others skilled in the art to which it appertains to make and use the same, reference being had to the accompanying drawing, and to the letters of reference marked thereon, which forms a part of this specification.

Our invention consists in a novel process of and apparatus for recovering the strontium from the residues or precipitates obtained in the separation of sugar from saccharine solutions by means of strontianite, substantially as hereinafter fully described, and specifically pointed out in the claims.

In the operation of slaking the calcined strontianite for the purpose of obtaining caustic-strontium crystals a slime-like residue is obtained, which yet contains, besides large masses of marl and lime, a considerable quantity of strontium. The recovery of the strontium from these residues has heretofore been incomplete, the method resorted to being to form the residues into bricks or blocks, and, after drying the same again, calcining and slaking the burned bricks, whereby a certain proportion only of the strontium is recovered, a second residue being obtained by this operation from which it is impossible to recover the strontium by a repetition of the process.

By means of our improved process and apparatus the strontium is recovered from the residues or precipitates in the form of pure carbonate of strontium.

The accompanying drawing illustrates the apparatus for carrying out our process by a vertical section.

The residues or precipitates, whether first or second, resulting from the process of treatment of saccharine solutions with strontianite are fed by a large pipe, 1, (preferably provided with means to catch or trap the stones,) to a hopper, H, and from the latter these residues pass between feed and crushing rolls R R to a tank, T, in which they are boiled for a few minutes with an excess of hydrochloric acid, whereby the whole of the strontium contained in the residue is dissolved. The acid is fed to the tank from a vessel, V. The boiling in the tank is effected by means of a perforated steam-coil, C, arranged on the bottom of the tank, and above which coil is a layer of filtering material, $f$, preferably gravel, between two perforated false bottoms or diaphragms, $d\ d'$. The filtered strong acid-reacting solution is conveyed from the tank T by a pipe, 2, provided with a stop-cock, S, and the branch pipes 3 3, provided with stop-cocks $S'\ S'$, to one or the other of the two tanks $T'\ T^2$, each of which is provided with a perforated steam-coil, $C'$, and stirrers or agitators $A'\ A^2$, of any suitable or preferred construction. Each tank $T'\ T^2$ has also a rotatable siphon-pipe, $P'\ P^2$, filled with asbestus, by means of which the liquid contents of the tank are drawn off. The acid solutions, while being agitated, are decomposed in the tank by means of suitably-diluted sulphuric acid, whereby the strontium only is obtained as a fine pulverulent precipitate in the form of sulphate of strontium, all the rest remaining in solution. This solution is drawn off from the tank by means of a siphon, and the precipitate is washed in water, and, after removal of the water by decantation, is boiled in the same tank in a solution of carbonate of soda or potash, or, what is still cheaper, in a suitably-concentrated lye of beet-root ashes, whereby the sulphate of strontium is converted into carbonate of strontium held in suspension in a solution of sodium or potassium sulphate, from which it is separated by an exhaust-filter, F, or any other suitable filtering appliances. The boiling of the precipitate in the tank is effected by means of steam conveyed thereto through the perforated coil $C'$.

We would remark that care should be had not to use an excess of sulphuric acid; otherwise gypsum would be formed; and should this happen by accident or carelessness on the part of the workmen, we add a warm solution of carbonate of ammonia to dissolve the gypsum.

In case the residues should contain iron, we eliminate the same, with the marl, by the addition of ammonia to the residues. The sulphuric acid liberated during the first operation in tank T can be further utilized. The ammonia is fed to tank T from vessel V'. The carbonate of ammonia, the sulphuric acid, and the soda or potassa solution, or the lye of beet-root ashes, are fed to tanks T' T² from vessels V², V³, and V⁴, respectively. The pipes 4, 5, and 6, leading from the vessels V² V³ V⁴, respectively, have each two branch pipes—one connected with tank T', the other with tank T², said branch pipes being provided with suitable stop-cocks, S⁴, S⁵, and S⁶, whereby either of said tanks may be connected with said vessels independently of the other. Each vessel or reservoir V V' V² V³ V⁴ is provided with a measuring-gage, $s\ s'\ s^2\ s^3\ s^4$, respectively, to enable the workmen to supply the tanks T T' T² with the necessary quantities of hydrochloric acid, ammonia, carbonate of ammonia, sulphuric acid, and soda solution or its equivalent.

It is evident that one tank T' or T² may be employed, if desired. To make the operation a continuous one, we, however, prefer to employ two tanks, as described, so that the solution from tank T may be fed to tank T² and treated while a quantity of said solution is being treated in tank T'.

It also is evident that any other suitable construction of apparatus than that shown may be used to carry out our process; yet we prefer the construction of apparatus as shown and described.

Having now described our invention, what we claim is—

1. The herein-described process of recovering the strontium salts from the residues or precipitates resulting from the treatment of saccharine solutions with strontium in the manufacture of sugar, which consists in dissolving the strontianite in said residues, filtering off the strontium solution, converting the strontium in the filtered solution into a sulphate, and finally reconverting the sulphate into a carbonate, substantially as described.

2. The herein-described apparatus, consisting in the combination, with the tank T, having filter $f$ and steam-coil C, the tank T', having steam-coil C', a siphon, and suitable agitating devices, said tanks being connected together by a valved pipe, of the vessels V V' V² V³ V⁴, the vessels V V' being connected with tank T, and those V² V³ V⁴ with tank T', by suitable valved pipes, substantially as and for the purposes specified.

3. The combination, with the tank T and the vessels V V', of the tanks T' T² and vessels V² V³ V⁴, all constructed and arranged for co-operation substantially as shown and described.

4. The combination, with the crushing and feeding rolls R R, the tank T, and vessels V V', of the tanks T' T², vessels V² V³ V⁴, and their valved communicating pipes 4, 5, and 6, having stop-cocks $s^4$, $s^5$, and $s^6$, and a filtering apparatus, all constructed and arranged for co-operation substantially as shown and described, for the purposes specified.

In testimony whereof we affix our signatures in presence of two witnesses.

DAVID SIDERSKY.
HERMANN PROBST.

Witnesses:
G. LOUBIER,
B. ROI.